United States Patent [19]
Somasekhara et al.

[11] 3,857,877
[45] Dec. 31, 1974

[54] 8-HYDROXY QUINOLINE DERIVATIVES

[75] Inventors: Shankar Somasekhara; Navinchandra Vasantrai Upadhyaya, both of Wadi Wadi, Baroda, India

[73] Assignee: Karamchand Premchand Private Limited, Ahmedabad, Gujarat State, India

[22] Filed: Jan. 12, 1973

[21] Appl. No.: 323,024

[52] U.S. Cl........ 260/283 S, 260/289 QX, 260/302, 424/258
[51] Int. Cl............................................. C07d 33/36
[58] Field of Search....... 260/283 S, 289 QX, 302 R

[56] References Cited
UNITED STATES PATENTS
3,679,695  7/1972  Moore et al. ................... 260/302 R OTHER PUBLICATIONS
Morrison and Boyd; Organic Chemistry, 1959, p. 412.

Primary Examiner—Donald G. Daus
Assistant Examiner—Mary C. Vaughn
Attorney, Agent, or Firm—Ladas, Parry, Von Gehr, Goldsmith & Deschamps

[57] ABSTRACT

8-Hydroxyquinoline derivatives of the formula 1

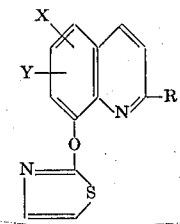

where R is hydrogen or methyl X and Y are same or different halogens like chlorine, bromine, or iodine in any two of the position 5,6 and 7 of the quinoline ring are provided according to this invention. These compounds are prepared by reacting a 2-halogeno-5-nitrothiazole and the required dihalogen substituted 8-hydroxy quinoline. The compounds of this invention are useful as potent anti the bacterial, antifungal and antiparasitic agent.

6 Claims, No Drawings

8-HYDROXY QUINOLINE DERIVATIVES

This invention relates to novel 8-hydroxy-quinoline derivatives, a process for their preparation and pharmaceutical compositions containing same.

It is an object of this invention to porpose novel 8-hydroxyquinoline derivatives and a process for the preparation of same.

It is another object of the invention to propose new pharmaceutical compositions having the novel compounds of this invention.

It is, in particular an object of this invention to propose novel 8-hydroxyquinoline derivatives having anti-bacterial, antifungal and antiparasitic properties and a process for preparing same.

It is thus, in particular, another ojbect of this invention to propose new pharmaceutical compositions having the novel compounds of this invention to be useful as potent antibacterial, antifungal and antiparasitic compositions against various bacterial, fungal and parasitic diseases.

According to this invention there is provided novel 8-hydroxyquinoline derivatives of formula I

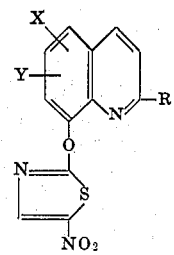

I wherein R is hydrogen or methyl, X and Y are same or different halogens like chlorine, bromine or iodine in any two of the positions 5, 6 and 7 of the quinoline ring.

This invention also provides a process for the manufacture of novel 8-hydroxyquinoline derivatives of formula I defined above which comprises reacting a 2-halogene-5-nitrothiazole of formula II

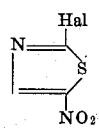

II where the halogen in the second position is chlorine or bromine, with an alkali metal salt of the required dihalogen substituted 8-hydroxy quinoline of formula III

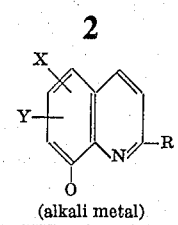

III where R, X and Y are as defined before.

The reaction can be carried out in the presence of a non-interfering organic solvent at temperatures below 100°C and above room temperature.

The alkali metal preferred is sodium or potassium in the compound of formula III.

The halogen preferred in the compound of formula II is chlorine or bromine.

As non-interfering organic solvents mention may be made of ethanol, acetone, methyl ethyl ketone or dimethyl sulfoxide though others are useful, the only criteria being that the solvent used should be a non-interfering type.

The reaction can be carried out at temperatures in the range of 40° – 100°C for about 60 minutes to 7 hours though these are not very critical for the reaction.

The obtained products may be purified, if required, by recrystallisation using for example benzene-hexane as solvent.

As novel compounds of this invention the following may be mentioned for illustration purposes only and is not intended to mean any restriction thereof.

8-(5-Nitrothiazolyl-2-oxy)-5,7-dichloro-quinoline
8-(5-Nitrothiazolyl-2-oxy)-5,7-dibromo-quinoline
8-(5-Nitrothiazolyl-2-oxy)-5,7-diiodo-quinoline
8-(5-Nitrothiazolyl-2-oxy)-5,7-dibromo-2-methyl-quinoline
8-(5-Nitrothiazolyl-2-oxy)-5,7-dichloro-2-methyl-quinoline It has been found by us that the novel 8-hydroxyquinoline derivatives of this invention possess remarkable anti-bacterial, anti-fungal and anti-parasitic properties as compared to known 8-hydroxy quinoline derivatives. The known derivatives have not yielded satisfactory results particularly due to their side effects.

The compounds of this invention are found to be satisfactory in the above respect.

For a better understanding of the properties of the compounds of the invention, detailed biological studies of these compounds were carried out and compared with those of "Quixalin" under similar conditions. The results of some of these comparative studied are presented in the Table 1 attached.

TABLE 1

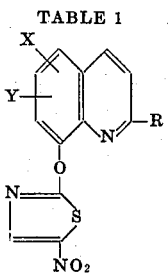

| Compound | | | M.P. °C. | Reference No., Example No. | Antimicrobial activity (in vitro) Organisms/MIC values in, mcg./ml. | | | | | | |
|---|---|---|---|---|---|---|---|---|---|---|---|
| X | Y | R | | | S. aureus | A/R S. aureus | E. coli | S. shigae | S. typhi | Ps. vulgaris | Ps. aerugenose |
| 5-Cl | 7-Cl | H | 122.4 | SRC 1111, Ex. 1-2 | 0.5 | 0.5 | 5-10 | 0.5 | 5.0 | 5.0 | 2.0 |
| 5-Br | 7-Br | H | 130-3 | SRC 1128, Ex. 3 | 5.0 | 5.0 | 10-0 | 5.0 | 10.0 | 5.0 | 20.0 |
| 5-Br | 7-Br | CH₃ | 119-121 | SRC 1134, Ex. 5 | 0.5 | 0.5 | 10.0 | 0.5 | 10.0 | 10.0 | 10.0 |
| 5-Cl | 7-Cl | CH₃ | 127-9 | SRC 1277 | 0.5 | 0.5 | 5-10 | 0.5 | 5.0 | 10.0 | 10.0 |
| Quixalin | | | | | 5 | 1-5 | 5 | 5 | 5 | 5 | 20 |

Table I – Continued

| Compound | | | | | Antifungal activity, organisms/MIC values in mcg./ml. | | | | Antituberculous activity | | |
|---|---|---|---|---|---|---|---|---|---|---|---|
| X | Y | R | M.P., °C. | Reference No., experiment No. | C. albicans | Tr. mentagrophytes | M. gypsum | Ph. jeanselmi | N-asteroide | Asp. fumigatus | My. tuberculosis MIC values in, mcg./ml. |
| 5-Cl | 7-Cl | H | 122.4 | SRC 1111, Ex. 1-2 | 1.0 | 5.0 | 5.0 | 20.0 | 5-10 | 5 | 20.0 |
| 5-Br | 7-Br | H | 130-3 | SRC 1128, Ex. 3 | 1.0 | 1.5 | 5.0 | 5.0 | 5.0 | 5.0 | 20.0 |
| 5-Br | 7-Br | CH$_3$ | 119-21 | SRC 1134, Ex. 5 | 1.0 | 5.0 | 5.0 | 5.0 | 10-20 | 5.0 | |
| 5-Cl | 7-Cl | CH$_3$ | 127-9 | SRC 1277 | 1-5 | 1-5 | 1-5 | 5-10 | 20-50 | 1-5 | 25-50 |
| Quixalin | | | | | 5 | 5 | 5 | 5 | 5 | 1 | |

The results shown in Table 1 will give an idea of the potent antibacterial and antifungal properties of the compounds of the invention.

The compounds of this invention can be used either alone or in conjunction with suitable pharmaceutically acceptable carriers therefor. It is also possible to employ either a single active compound of this invention or a combination of two or more active compounds as is found expedient.

As pharmaceutically acceptable carriers, conventional solid and liquid carriers can be used and suitable formulations can be in the form of liquids, dusts, tablets, granules, emulsifiable concentrates and wettable powders etc.

The different formulations can be prepared by well known techniques. For example liquid formulations can be prepared by dissolving the active ingredient/s in a suitable pharmaceutically acceptable liquid carrier or diluent with or without the use of known adjuvants like conventional emulsifying agents, wetting agents or dispersing agents etc.

It is possible, as stated before, to use the active compound alone in required doses. However, in the formulations, the concentration of the active ingredient/s may normally be a minimum of 1.0% by weight to a maximum of 60.0% by wt., the preferred range being, 25 to 60% though the amounts of the active ingredient/s depend on the type and severity of the disease, the form of the composition, the type of the active ingredient etc.

The invention will now be explained with reference to the following examples which are by way of illustration only and do not mean any restriction thereof.

EXAMPLE 1

8-(5-Nitrothiazolyl-2-oxy)-5,7-dichloroquinoline (SRC 1111)

Sodium salt of 5,7-dichloro-8-hydroxyquinoline (4.72 g; 0.02 mole) and 2-chloro-5-nitrothiazole (3.3g. 0.02 mole) were taken in dimethylsulphoxide (10 ml) and heated at 60° – 70°C for 2 hours. The reaction product was cooled and diluted with water; the gummy solid was separated by decantation and triturated with sodium acetate solution to obtain the crude title product. It was crystallised from benzene-hexane; m.p. 122°-24°C. Yield 5.5 gm.

EXAMPLE 2

8-(5-Nitrothiazolyl-2-oxy)-5,7-dichloroquinoline (SRC 1111)

Potassium salt of 5,7-dichloro-8-hydroxyquinoline (2.5 g; 0.01 mole) and 2-bromo-5-nitrothiazole (2.1 g; 0.01 mole) were refluxed in ethylmethyl ketone (50 ml) for 3 hours. The solvent was distilled off in vacuo. The residue was triturated with sodium acetate solution (3 g in 100 ml). The insoluble material was crystallised from benzene-hexane to botain the title product melting at 122°-24°C. Yield 2.9 gms.

EXAMPLE 3

8(5-Nitrothiazolyl-2-oxy)-5,7-dibromoquinoline (SRC 1128)

Sodium salt of 5,7-dibromo-8-hydroxyquinoline (6.5 g; 0.02 mole) and 2-bromo-5-nitrothiazole (4.2 g; 0.02 mole) were taken in dimethylsulphoxide (10 ml) and heated at 50°-60°C for 3 hours. The reaction product was cooled and diluted with water (100 ml) and sodium bisulphite (1 g). The gummy solid was separated by decantation. It was taken into benzene. The benzene phase was washed with 1% sodium bisulphite solution (100 ml), 2% sodium acetate solution (100 ml) and then with water. The benzene phase was dried over sodium sulphate, concentrated and diluted with hexane to obtain the crude title product. It was crystallised from benzene-hexane m.p. 131°-33°C. Yield 6.7 gm.

EXAMPLE 4

8-(5-Nitrothiazolyl-2-oxy)-5,7-diiodoquinoline (SRC 1113)

Sodium salt of 5,7-diodo-8-hydroquinoline (8.38 g; 0.02 mole) and 2-chloro-5-nitrothiazole (3.3 g; 0.02 mole) were refluxed and stirred in dry acetone for 6 hours. The solvent was removed in vacuo. The residue was taken in benzene (100 ml) and washed with 1% sodium bisulphite solution (100 ml), 2% sodium acetate solution (100 ml) and then with water. The benzene phase was dried over sodium sulphate, concentrated to one-fourth of the volume and then diluted with hexane to obtain the crude title product. It was crystallised from benzene-hexane; m.p. 135°-37°C. Yield 7.3 grams.

EXAMPLE 5

8-(5-Nitrothiazolyl-2-oxy)-5,7-dibromo-2methyl-quinoline (SRC 1134)

Sodium salt of 5,7-dibromo-2-methyl-8-hydroxyquinoline (6.8 g; 0.02 mole) and 2-chloro-5-nitrothiazole (3.3 g; 0.02 mole) were taken in absolute ethanol (100 ml) and refluxed for 5 hours. The solvent was distilled off in vacuo; the residue was taken in benzene (100 ml) and washed with 1% sodium bisulphite solution (100 ml), 2% sodium acetate solution (100 ml) and then with water. Yield 6.3 gms.

The benzene phase was dried over sodium sulphate, concentrated to 20 ml and diluted with hexane to obtain the crude title product; it was crystallised from benzene-hexane; m.p. 119°-21°C.

We claim:

1. 8-Hydroxyquinolines of the formula I

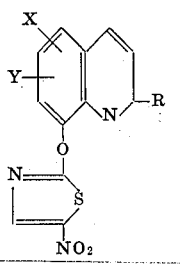

wherein
R is H or methyl, X and Y are the same or different halogens like, chlorine, bromine or iodine in any two of the positions 5, 6 and 7 of the quinoline ring.

2. The compound according to claim 1 wherein X and Y are 5,7-dichloro and R is hydrogen.

3. The compound according to claim 1 wherein X and Y are 5,7-dibromo and R is hydrogen.

4. The compound according to claim 1 wherein X and Y are 5,7-diiodo and R is hydrogen.

5. The compound according to claim 1 where in X and Y are 5,7-dibromo and R is methyl.

6. The compound according to claim 1 wherein X and Y are 5,7-dichloro and R is methyl.

* * * * *